July 29, 1969    J. A. McCONNELL    3,458,092
MEASURING AND DISPENSING DEVICE
Filed June 26, 1967    2 Sheets-Sheet 1

INVENTOR.
JOHN A. McCONNELL
BY
ATTORNEYS

July 29, 1969

J. A. McCONNELL 3,458,092

MEASURING AND DISPENSING DEVICE

Filed June 26, 1967

*INVENTOR.*
JOHN A. McCONNELL
BY
*Allen and Elwomy*
ATTORNEYS

United States Patent Office 3,458,092
Patented July 29, 1969

3,458,092
MEASURING AND DISPENSING DEVICE
John A. McConnell, Newark, Calif., assignor to McConnell and Associates, Newark, Calif., a limited partnership
Filed June 26, 1967, Ser. No. 648,760
Int. Cl. G01f 11/10
U.S. Cl. 222—361                                      2 Claims

ABSTRACT OF THE DISCLOSURE

A measuring and dispensing closure for containers of granular material. This dispensing closure employs a drawer partially slidable in and out of a chamber therein so that a granular material-receiving cavity in the drawer may be positioned under an opening in the disk-shaped cover member provided in the closure. This cavity is provided with a trap door and internal ridges are provided in the closure for engaging the trap door and holding it closed when the drawer is inserted into the chamber, and the cavity thereof is positioned under the opening in the cover member to receive the granular material. When the drawer is pulled out of the chamber the trap door is allowed to open and the measured quantity of granular material is dispensed from the cavity in the drawer through the open trap door.

---

This invention relates to a measuring and dispensing closure for containers of granular material.

An object of this invention is to provide an improved measuring and dispensing closure for containers or packages of granular material.

Another object of this invention is to provide an improved measuring and dispensing closure for containers or packages of granular material constructed so that it may be readily applied to such containers or packages in place of the conventional closure.

Still another object of this invention is to provide an improved measuring and dispensing closure for containers or packages of granular material constructed so that it may be readily applied to such containers or packages in place of the conventional closure.

Still another object of this invention is to provide an improved measuring and dispensing closure for containers or packages of granular material, said closure being provided with a compartment for receiving a drawer having a cavity which is adapted to be filled with granular material from the container when the drawer is inserted all the way into said compartment and the container is inverted, said cavity being provided with a trap door which is held closed when the cavity is being filled with granular material and which is allowed to open when the drawer is partially withdrawn from the compartment so that the measured amount of granular material may be emptied from this cavity.

Other and further objects of this invention will be apparent to those skilled in the art to which it relates from the following specification, claims and drawing, in which, briefly:

Figure 1:
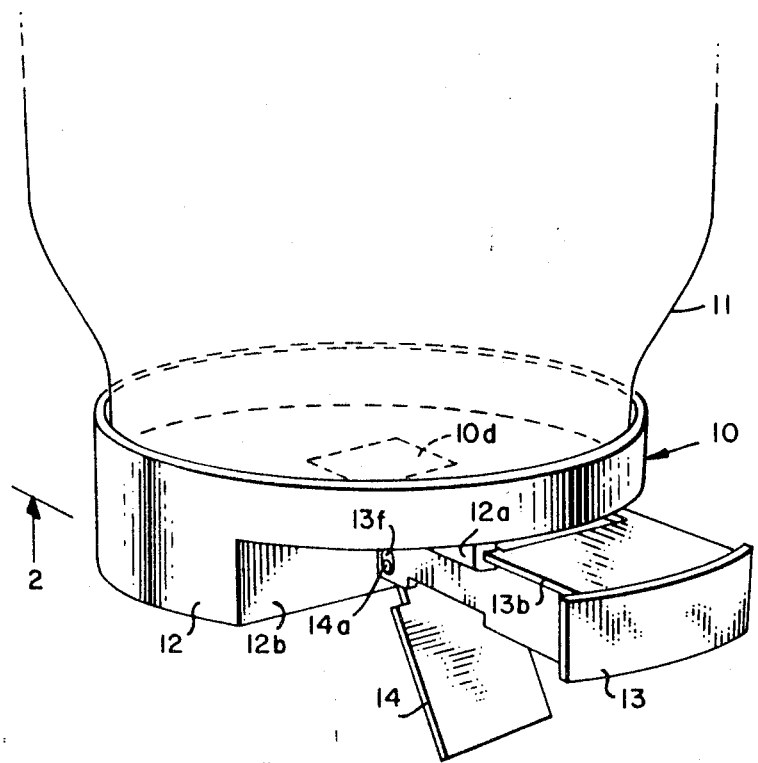
FIG. 1 is a perspective view of this measuring and dispensing closure shown with the drawer employed therein partially withdrawn from the closure and the trap door of the drawer open.
Figure 2:
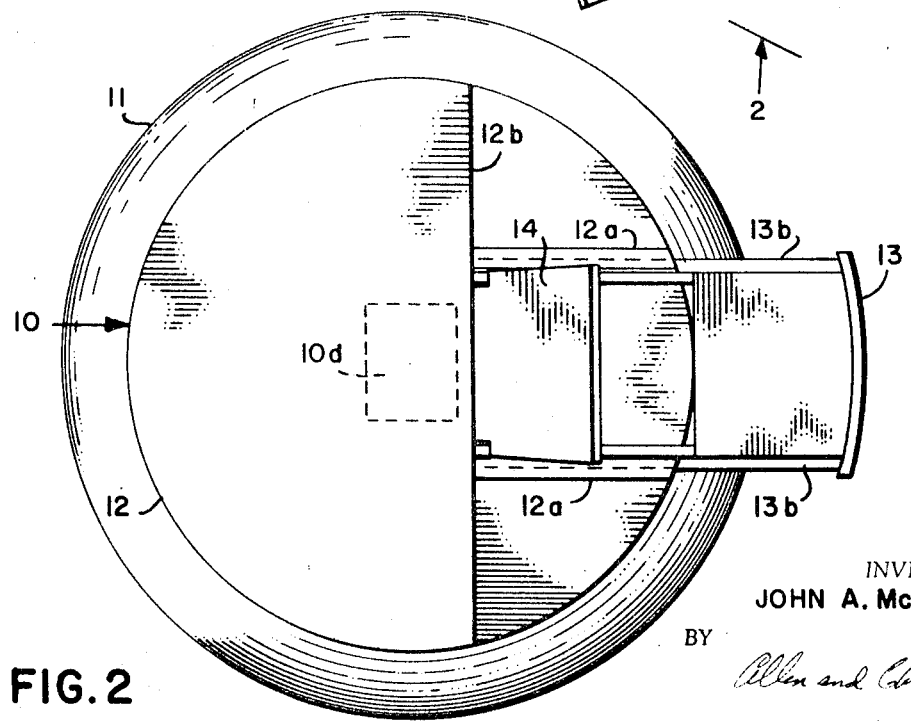
FIG. 2 is a plan view of the measuring and dispensing closure of this invention looking up on FIG. 1 along the line 2—2.
Figure 3:
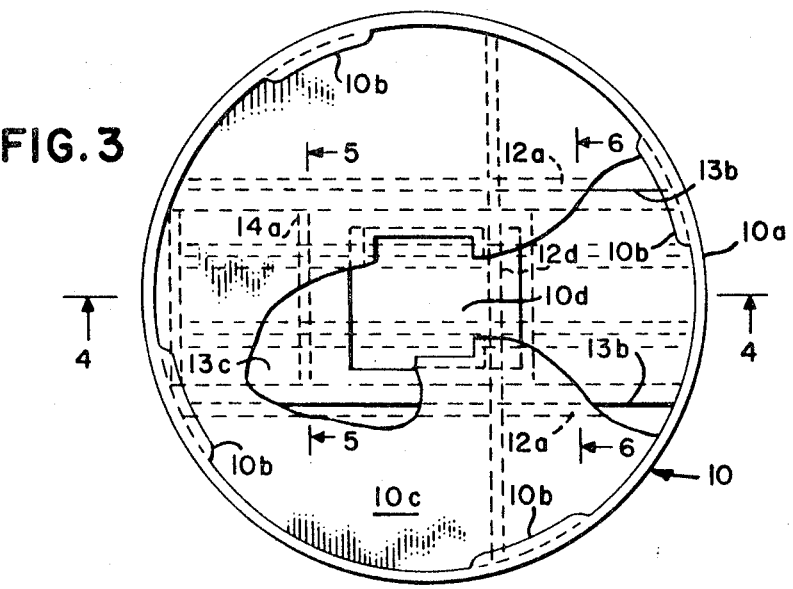
FIG. 3 is a plan view showing the inside of the measuring and dispensing closure.
Figure 4:
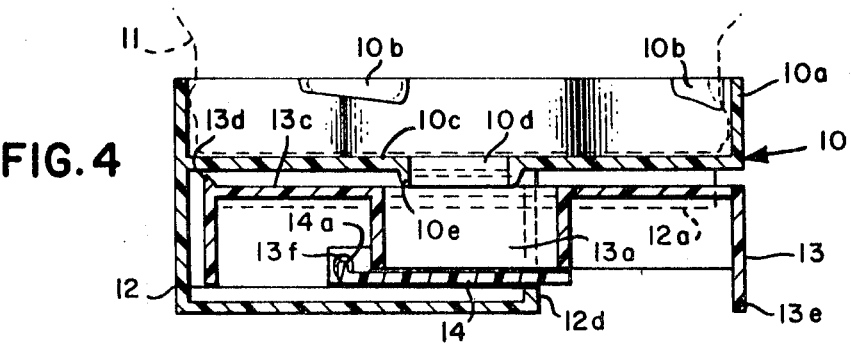
FIG. 4 is a sectional view taken along the line 4—4 of FIG. 3.
Figure 5:
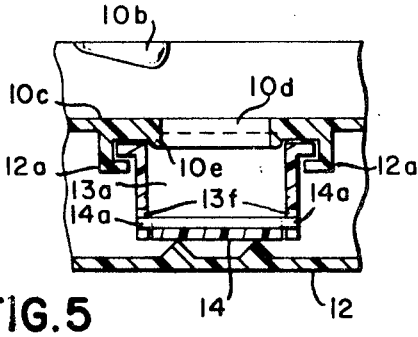
FIG. 5 is a sectional view taken along the line 5—5 of FIG. 3 showing one form of hinge arrangement employed for the trap door.
Figure 6:
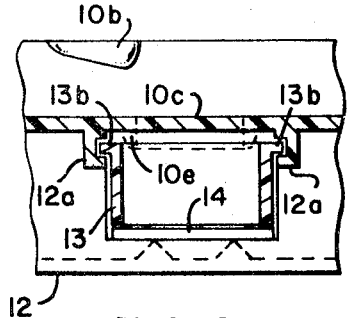
FIG. 6 is a sectional view taken along the line 6—6 of FIG. 3.

Referring to the drawing in detail, reference numeral 10 designates a closure for a jar or other package. This closure is provided with a skirt 10a which is adapted to engage the neck of the jar 11 and be held thereon by inwardly extending projections 10b which are adapted to engage threads or similar projections provided to the neck of the jar. Other ways of holding the skirt 10a fastened to the top of the container may be provided and these may include applying pressure adhesive tape or the like to the outside of the skirt 10a and the adjacent surface of the container. The closure 10 is provided with a disk-shaped cover member 10c which is attached to the skirt 10a and which is provided with a substantially centrally disposed opening 10d. A wiper ridge 10e is provided around the opening 10d.

Wall structure 12, which is attached to the cover member 10c, receives the drawer 13 which is slidable therein so that the cavity 13a thereof may be aligned with the opening 10d to receive granular material from the container 11 when the container is inverted. The drawer 13 is of elongated configuration and is of substantially the same length as the diameter of the closure 10. Suitable side rails 13b are provided to the drawer 13 and these are slidable in the recessed supporting members 12a which are attached to the disk-shaped cover member 10c for slidably supporting the drawer 13 on the latter disk-shaped member.

The wall structure 12, which is attached to the members 10a and 10c of the closure, may be made of a size so that it will cover more than half of the disk-shaped member 10c as shown in the drawing, or it may be made of a size such as to accommodate the drawer 13 only so that this drawer will be slidable in a compartment formed in this wall structure.

The drawer 13 is provided with a trap door 14 which forms the bottom in the cavity 13a when the closure is inverted. When the drawer 13 is pushed into the cavity or compartment formed in wall structure 12, the trap door 14 is held closed by the internal ridges 12d which are part of the bottom wall of the closure. Thus, the trap door 14 engages ridge 12d and is held closed when the container is inverted and the drawer 13 is positioned with the cavity 13a thereof under the opening 10d in the cover member 10c of the closure. During this inverted position, granular material from the container 11 drops and fills the cavity 13a.

After the cavity 13a of the drawer 13 is filled with granular material, the drawer 13 may be pulled outward from the closure structure by gripping the projection 13e on the forward end of the drawer. Projection 13e may be made of a height such that it extends to the same plane as the top of structure 12 so that jars 11 may be stacked one above the other.

The trap door 14 is attached to the side members of the drawer 13 by means of a hinge employing the short projections 14a which are integral with the sides of the trap door 14 and which are rotatably positioned in the holes 13f formed in the respective sides of the drawer. When the drawer 13 is partly withdrawn from the compartment in the wall structure 12, the trap door 14 drops down as shown in FIG. 1 and allows the granular material to drop out of the cavity 13a.

The drawer 13 may be assembled with the closure structure by inserting the drawer into the opening formed in the wall 12b and pressing the drawer inward. The projection 13d of drawer 13 normally acts as a stop to prevent the drawer from being pulled out completely. However, this projection and the ridge 10e will yield sufficiently to allow the drawer to be inserted into the compartment in the wall structure 12. After the projection 13d clears the ridge 10e, the ridge 10e comes into wiping contact with the cover member 10c. Thereafter the ridge 10e acts as a wiper on the surface of the member 13c to prevent granular material from working its way between the cover member 10c and this projection into the cavity in the wall structure 12.

Figure 7:
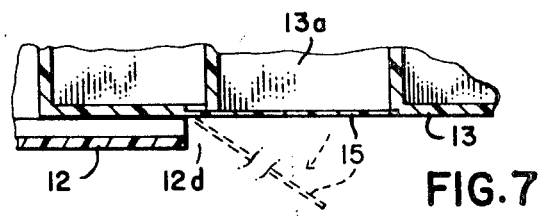
FIG. 7 is a sectional view similar to FIG. 5 showing another form of hinge arrangement for the trap door.

A modified form of hinge is provided as shown in FIG. 7 which is made of a thin plastic connection between the door 15 which corresponds to the trap door 14, previously described, and the wall of the drawer 13. Thus, the trap door 15 may be made integral with the drawer and the projections 14a of the drawer 14 and holes 13f in the sides of the drawer 13 may be eliminated.

While I have shown a preferred embodiment of the invention, it will be understood that the invention is capable of variation and modification from the form shown.

I claim:

1. In a measuring and dispensing closure for containers of granular material which are adapted to be inverted to dispense a measured quantity of the granular material therefrom, the combination comprising a disk-shaped cover member having a hole substantially in the center thereof, means comprising a circular side wall attaching said cover member to the mouth of a container of granular material, a drawer having a cavity in substantially the central portion thereof adapted to be positioned in registry with said hole for receiving a predetermined amount of granular material therein, means slidably supporting said drawer on said cover member so that said cavity may be brought into registry with said hole, wall structure attached to said cover member having an arcuate side wall that is substantially coextensive with a part of said circular side wall and terminating in an end wall coinciding with a cord of said circular side wall, said wall structure having a compartment formed by a substantially flat member parallel to said cover member, said substantially flat member extending to said end wall and to said arcuate side wall, said compartment slidably receiving part of said drawer through an opening in said end wall, a trap door for said cavity, means hinging said trap door to said drawer, said end wall having a part thereof adjoining said opening holding said trap door closed when said drawer is positioned with said cavity in registry with said hole and when said cavity is adapted to be filled with granular material by inverting said container, said trap door being adapted to be moved from said holding part when said drawer is partially withdrawn from said compartment and said trap door is allowed to open to release the granular material from said cavity while said container is in the inverted position, said drawer having a portion thereof normally exposed and extending out of said compartment so that the sides of said exposed part are adapted to be gripped when it is desired to withdraw said drawer to free said trap door and empty the contents of said cavity.

2. In a measuring and dispensing closure for packages and containers of granular material, the combination as set forth in claim 1 further characterized in that said drawer and trap door are made of plastic and said hinging means comprises thin, flexible plastic integral therewith.

References Cited

UNITED STATES PATENTS

| 2,852,167 | 9/1958 | Lempart | 222—361 X |
| 3,056,532 | 10/1962 | Germano | 222—361 |
| 3,276,637 | 10/1966 | Fender | 222—361 X |

FOREIGN PATENTS 8,162   3/1909   Great Britain.

STANLEY H. TOLLBERG, Primary Examiner